(12) United States Patent
Sereboff (10) Patent No.: US 7,056,564 B2
(45) Date of Patent: Jun. 6, 2006

(54) GEL FILLED TRAUMA MITIGATION DEVICE AND COMPOSITION THEREFORE

(76) Inventor: Joel L. Sereboff, 2215 Millridge Rd., Owings Mills, MD (US) 21117

( * ) Notice: Subject to any disclaimer, the term of this patent is extended or adjusted under 35 U.S.C. 154(b) by 634 days.

(21) Appl. No.: 09/923,991

(22) Filed: Aug. 7, 2001

(65) Prior Publication Data

US 2003/0190453 A1 Oct. 9, 2003

Related U.S. Application Data

(60) Provisional application No. 60/223,633, filed on Aug. 8, 2000.

(51) Int. Cl.
*B29D 22/00* (2006.01)
*B29D 23/00* (2006.01)
*B32B 1/08* (2006.01)

(52) U.S. Cl. .................. 428/36.5; 728/35.7; 728/34.1; 728/71; 728/73

(58) Field of Classification Search ............... 428/35.7, 428/36.5, 34.1, 68, 71, 72, 73; 293/104, 293/107, 109, 110, 134; 267/140.11, 139, 267/140

See application file for complete search history.

(56) References Cited

U.S. PATENT DOCUMENTS

| | | | | |
|---|---|---|---|---|
| 3,574,379 A | * | 4/1971 | Jordan | 293/71 |
| 3,610,609 A | * | 10/1971 | Sobel | 267/140 |
| 3,782,768 A | * | 1/1974 | Moore | 293/71 R |
| 4,148,505 A | * | 4/1979 | Jensen et al. | 280/784 |
| 4,586,738 A | * | 5/1986 | Butler et al. | 293/107 |
| 5,113,540 A | | 5/1992 | Sereboff | |
| 5,141,279 A | * | 8/1992 | Weller | 296/146 |
| 5,195,199 A | | 3/1993 | Sereboff | |

FOREIGN PATENT DOCUMENTS

WO 97/25551 * 7/1997

OTHER PUBLICATIONS

Merriam-Webster's Collegiate Dictionary, Tenth Edition, 1997, Merriam-Webster, Incorporated, p. 717.*

* cited by examiner

*Primary Examiner*—Michael C. Miggins (57) ABSTRACT

A trauma mitigation device is provided which includes, an enclosure having a fluid impervious barrier, a crushable matrix disposed within said enclosure, and a viscous fluid disposed within said enclosure. Both the matrix and the fluid absorb energy when subjected to an impact force. A composition to be used in the device is also provided. The composition includes a viscous fluid in an amount of about 60–80% by weight of the composition and a plurality of macrosphere particles, in an amount of about 20–40% by weight of the total composition, disposed within said viscous fluid.

23 Claims, 6 Drawing Sheets

GEL FILLED TRAUMA MITIGATION DEVICE AND COMPOSITION THEREFORE

CROSS REFERENCE TO RELATED APPLICATIONS

This Application claims the benefit of U.S. Provisional Application Ser. No. 60/223,633 filed Aug. 8, 2000.

FIELD OF THE INVENTION

This invention provides laminar devices for mitigating trauma to humans and other members of the animal kingdom, that would occur upon impact as a result of automobile collisions, boating accidents, and the like.

BACKGROUND

When an occupied vehicle is involved in a collision, forces are transmitted through the materials of the vehicle to the occupants of the vehicle; another concomitant accident generally occurs, often referred to as the second collision, which subjects the occupants to impacts with the inside surfaces of the vehicle. For example, in some automobile collisions, it has been measured that 6 kilonewtons of force are imposed on the tibia of an occupant, resulting in compound fractures. As another example, in racing boats and on the seats of log skitters, damaging forces may be transmitted through the construct of the vehicle and to the anatomy of occupants. The present invention is designed to eliminate or mitigate traumatic injuries due to such impacts.

SUMMARY

The present invention provides a device that helps to dissipate the energy of the impact rather than allowing it to be transmitted directly to the protected subjects (e.g. occupants of a vehicle). The trauma-mitigating effects are provided by a laminar (flat layered) device of the present invention, sometimes referred to herein for short as a "laminate." Devices of the present invention may be produced in various thicknesses, preferably 9 cm and less. The elements of the laminar device have cumulative effects in protecting the subjects when an impact occurs. The laminate is intended to minimize damaging forces which may be transmitted to the lower limbs and other body parts. Included in this invention are several embodiments designed to protect occupants in a vehicle from injury to limbs and body surfaces due to the "second collision" and/or transmission of force through the structural elements of the vehicle. The invention helps to reduce impact forces, and resulting injury, by providing a multilayered device between a source of impact and the protected subject, e.g. a vehicle and its occupants.

When a vehicle is in motion, it moves at an essentially steady speed along with the human occupants. A collision causes the vehicle to undergo a rapid deceleration. The occupants continue to move at the same steady pace as the vehicle did initially. When the occupants come into contact with the decelerating vehicle, portions of the anatomy experience the force produced by the difference in deceleration of the human body and the vehicle. A device of the present invention reduces the impact on any one portion of the anatomy that would otherwise be produced by this deceleration difference, thus resulting in reduced force and reduced injury.

The space or distance between the interior of a vehicle and the occupant is limited. Therefore, an intervening laminate must effect a reduction in relative speed between the two over a short distance. The shorter the distance and the shorter the time, the greater the energy generated. One function of the laminate is to undergo deformation, converting to heat the energy generated. A second function of the laminate is to minimize the force conveyed to the subject's anatomy by spreading it over as wide an area as possible. This results in a large reduction in trauma and concomitant injury to a part of the anatomy which might be impacted.

The laminate of the current invention efficiently provides the aforesaid functions. Some layers in the laminate compress and deform when forces are applied. Other layers respond at the point of contact to distribute the force over an area of the device. Internal to one of the layers, elements within a viscous fluid interact to dissipate forces.

In certain embodiments, the laminate is located on and integral to the footwell or toepan surface. It could also be used on the knee bolster to protect the driver and front seat passenger.

In its most general form, the laminate of the present invention comprises an enclosed crushable structure adapted to deform in a predetermined manner upon sudden impact. The enclosed crushable structure comprises a fluid-impervious flexible enclosure containing a crushable matrix bathed in a highly viscous fluid composition.

The crushable matrix desirably comprises a multiplicity of matrix elements arrayed within and each disposed generally perpendicular to the principal plane of the laminate. These matrix elements may, for example, be cylindrical, hemispherical or pyramidal, or a mixture thereof. Preferably some or all of the matrix elements are formed of a pair of hemispheres or pyramids secured together at a convexity or an apex. Optionally, some or all of the matrix elements are provided with a multiplicity of crushable arms extending therefrom. Optionally, the hemispherical or pyramidal elements may be used in combination with cylindrical elements.

Optionally the enclosed crushable structure includes a thin supporting layer above and/or below the multiplicity of matrix elements. Such a supporting layer may be a ductile metal such as aluminum or copper, in a corrugated or other crushable shape, or it may be cast or otherwise fashioned as a corrugated, honeycomb or similar shape of polymeric material, having a rubbery or solid consistency, or it may be entirely or partly of ceramic or ceramic alloy.

Alternatively, such a thin supporting layer may be sandwiched outside the enclosed crushable structure.

The fluid-impervious flexible enclosure that encloses the enclosed crushable structure may be of polymeric film or of rubberized or elastomeric woven or nonwoven fabric of suitable toughness to withstand expected forces without rupturing. It s preferably formed of a pair of parallel 20-mil-thick rubberized, fluid-impervious barriers. These barriers may optionally be formed of a single sheet folded over itself. They may be joined together by a somewhat thinner film (e.g. 10 to 15 mil) along some or all of the periphery. One or more edges of the enclosure preferably have one or more accordion pleats (gussets) to accommodate percussive expansion along the plane of the laminate.

The highly viscous fluid composition is enclosed in the fluid-impervious flexible enclosure. It comprises a viscous fluid having a viscosity from about 300,000 CPS to about 6 million CPS (i.e. semi-solid, such as a gel or block polymer). When there is an impact on a device of the present invention, the crushable matrix interacts with the viscous fluid to transfer energy thereto or therein, generating movement of the elements within the viscous fluid and movement along the plane of the laminate and also dissipating energy in the form of heat.

Preferably the highly viscous fluid also comprises low-density microsphere particulates, having a diameter of about 100 to 400 microns. Such microsphere particulates may be ceramic or plastic, or a mixture of both may be used.

More preferably, the highly viscous fluid comprises macrosphere particulates, e.g. a foamed polymer such as polystyrene, having a diameter of about 0.5 mm to 5 mm, either alone or in combination with microspheres. Desirably, particulates of various sizes comprise 20% to 40% of the highly viscous fluid by volume. When there is an impact on a device of the present invention, the crushable matrix interacts with the particulate components of the viscous fluid to transfer energy thereto.

The fluid-impervious flexible enclosure may comprise a polymer film of suitable thickness and toughness to maintain its integrity through the expected impacts, or it may be made of two or more plies comprising fabric or elastomer. One such ply may be of polynorbornene or butyl rubber, to provide softness and additional resiliency. Major portions of the enclosure may optionally be made by coextrusion, e.g. of polymer film and metallic film.

For adherence to metal, e.g. the floor of a vehicle or a thin crushable layer of ductile metal as described hereinabove, a metal-adhering film such as XU661126.02 (Dow Chemical Co., Midland, Mich.) may be employed.

In another aspect of the invention, the enclosed crushable structure is surmounted by a layer of fully reticulated foam. A source of pressurized air is provided so that when an impact (sudden deceleration or acceleration) is sensed, the foam layer is pressurized.

In an embodiment used as an example herein, a laminate of the present invention is composed of the following layers. The uppermost layer is the carpet provided as automotive floor covering. The next layer is of reticulated foam. Then comes the enclosed crushable structure, starting with a film that forms the top of the fluid-impervious flexible enclosure. The thin supporting layer within the flexible enclosure is a honeycomb or corrugated structure designed to collapse upon impact. A matrix comprising a plurality of matrix elements is immediately outside the thin supporting layer. It is bathed in a highly viscous fluid composition, which includes microspheres and macrospheres. A corrugated aluminum thin supporting layer is next outside. The bottom of the flexible enclosure is next, and optionally an adhesive film is provided which attaches to the vehicle structure.

DETAILED DESCRIPTION

The present invention will be described in greater detail in conjunction with the appended drawings.

Figure 1:
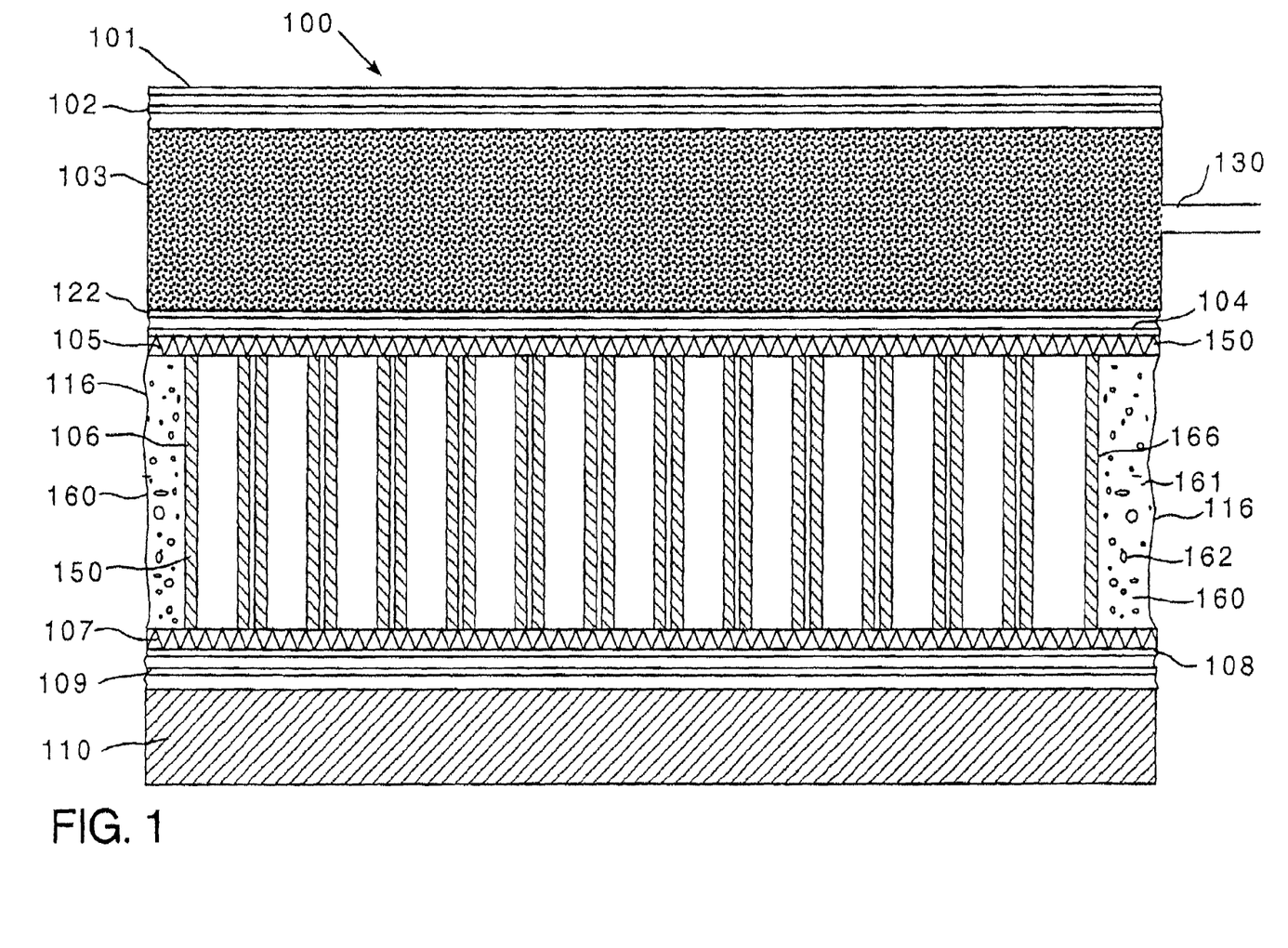
FIG. 1 is a diagrammatic, cross-sectional exploded view of an embodiment of the present invention wherein the matrix elements are cylindrical.

FIG. 1 shows an example of the laminar trauma-mitigation device 100 of the present invention as may be applied to the footwell or toepan 110 of an automobile. For easier viewing, some of the layers that are actually contiguous are shown slightly separated, in this somewhat exploded view.

The carpet layer 101 is commonly used floor covering in automobiles, either woven or pile carpeting. It is decorative as well as functional, as it may be color-coordinated with the rest of the vehicle, and it is the layer in direct contact with the protected occupants of the vehicle.

An upper cushion layer 102 is desirably provided below the carpet layer 101. It is of soft, resilient material such as butyl rubber, polynorbornene, polyvinyl chloride or polyurethane.

A foam layer 103 is desirably provided next below. This layer may be of polyurethane or other inflatable fully-reticulated foam and is provided with an inflation tube 130 through which external air pressure may be provided to expand it and provide additional resiliency. Desirably pressurized air is directed into foam layer 103 through the inflation tube 130 when an impact is sensed and the vehicle's air bags are deployed. In certain embodiments of the present invention, the foam layer 103 may be omitted.

Optionally a lower cushion layer 122 may be provided immediately below the foam layer 103.

An upper enclosure layer 104 is provided below the foam layer 103 (and below a lower cushion layer 122 if such is included). The upper cushion layer 102 and upper enclosure layer 104 desirably serve to seal the upper and lower surfaces of foam layer 103 to make it generally airtight and susceptible to inflation through inflation tube 130. Alternatively, the surfaces of foam layer 103 may be sealed by a thin polymeric film or other means.

The fluid-impervious flexible enclosure 120 that encloses the enclosed crushable structure 150 may be of polymeric film or of rubberized or elastomeric woven or nonwoven fabric of suitable toughness to withstand expected forces without rupturing. It is preferably formed of a pair of parallel 20-mil-thick rubberized, fluid-impervious barriers 104 and 108. The barriers 104, 108 are joined together by a somewhat thinner film 116, having accordion pleats forming gussets to accommodate percussive expansion along the plane of the laminate.

A thin supporting honeycomb metallic layer 105 comprises an upper portion of the crushable structure 150. It provides excellent behavior by collapsing under pressure and absorbs energy by so doing. In an alternative embodiment, a layer of corrugated sheet aluminum or other similar material may be substituted.

Within the flexible enclosure 120 is a highly viscous fluid 160 which bathes the contents thereof. It comprises a viscous fluid having a viscosity from about 300,000 CPS to about 6 million CPS (i.e. semisolid, such as a gel or block polymer). When there is an impact on a device of the present invention 100, the crushable matrix 106 interacts with the viscous fluid 160 to transfer energy thereto or therein, generating movement of the elements within the viscous fluid and movement along the plane of the laminate and also dissipating energy in the form of heat.

Preferably the highly viscous fluid also comprises low-density microsphere particulates 161, having a diameter of about 100 to 400 microns. Such microsphere particulates 161 may be ceramic or plastic, or a mixture of both may be used.

More preferably, the highly viscous fluid also comprises macrosphere particulates 162, e.g. a foamed polymer such as polystyrene, having a diameter of about 0.5 mm to 5 mm. Desirably, particulates of various sizes comprise 20% to 40% of the highly viscous fluid 160 by volume.

Figure 2:
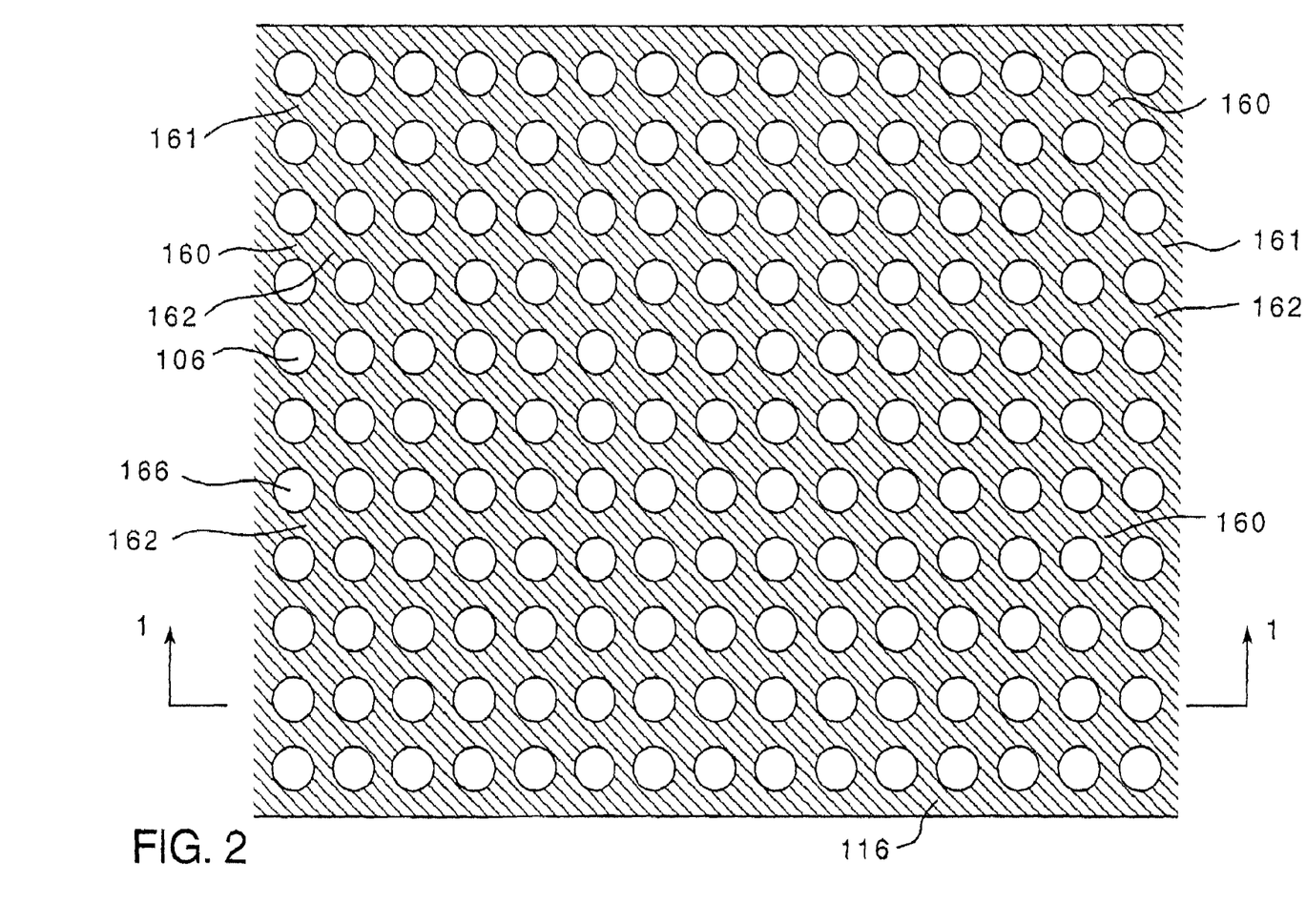
FIG. 2 is a plan view of the embodiment of FIG. 1, taken along line 2—2.

The mid section of the crushable structure 150 is a crushable matrix 106 formed from a plurality of vertically-oriented cylindrical elements 166. FIG. 2 is a plan view of the crushable matrix 106 showing the cylindrical elements 166 arrayed as in a grid. Any of various layouts for the crushable elements may be employed in accordance with the present invention, the important point being that the elements be bathed in the highly viscous fluid 160. Optionally some or all of the elements may be filled with air (as shown in FIGS. 1 and 2) or may alternatively contain highly viscous fluid 160.

The lower portion of the crushable structure 150 is formed by a thin supporting honeycomb metallic layer 107. In an alternative embodiment, a layer of corrugated sheet aluminum or other similar material may be substituted.

Below the honeycomb metallic layer 107 is the fluid-impervious barrier 108 mentioned above. This constitutes the bottom of the flexible enclosure 120.

A metal-adhering film 109 such as XU661126.02 (Dow Chemical Co., Midland, Mich.) may be employed to secure the flexible enclosure 120 to the toepan 110 or other metallic structure in a vehicle. It is a high quality adhesive tape which serves to attach the laminate structure to a metal surface in the automobile where the environment of large swings of temperature, and with lubricants present which might interfere with adhesion. Optionally, the lower fluid-impervious barrier 108 may itself be formed of such film.

Figure 3:
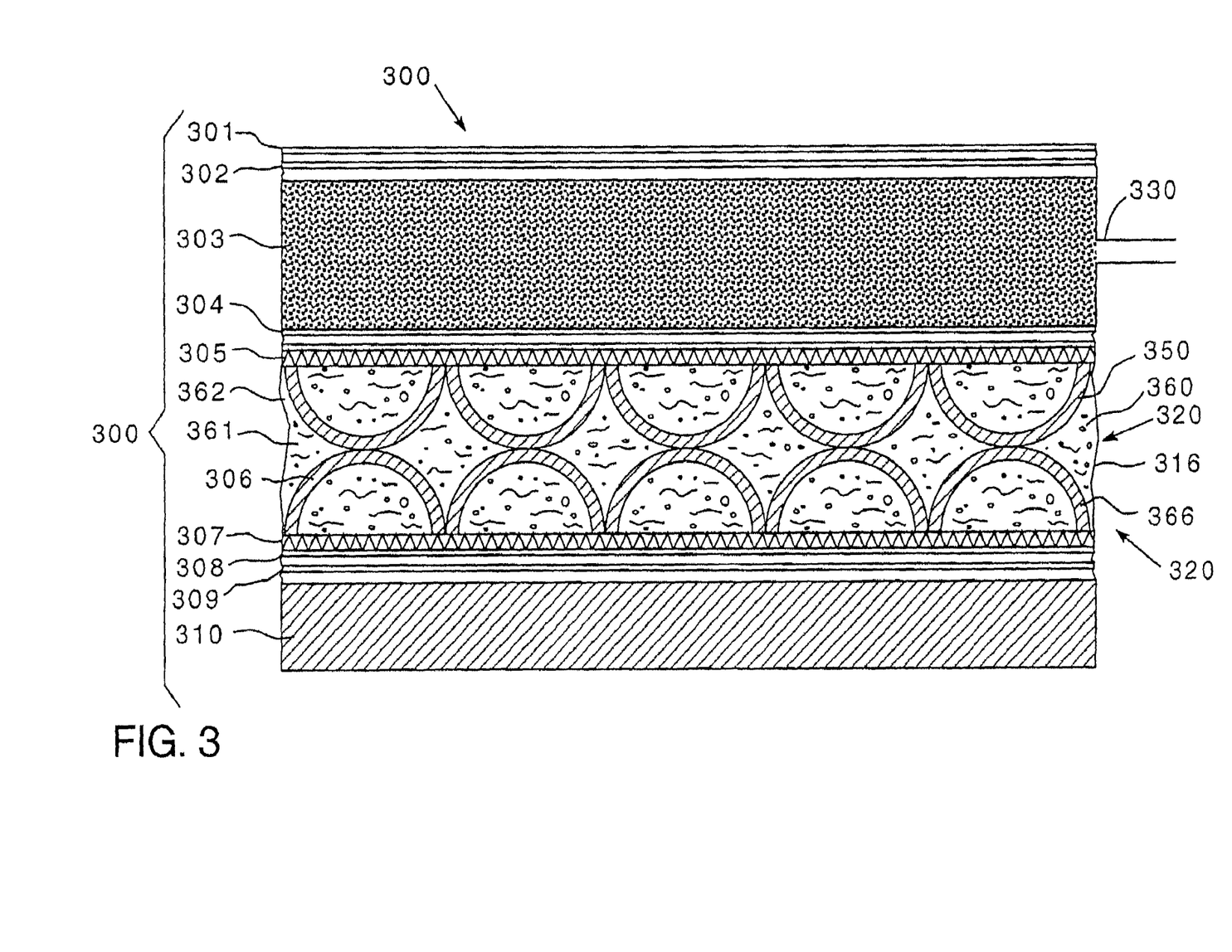
FIG. 3 is a view similar to FIG. 1, of an alternative embodiment wherein the matrix elements comprise joined hemispherical sections.

FIG. 3 shows an alternative embodiment of the trauma-mitigation device 300 of the present invention. A carpet 301 overlies an upper cushion layer 302. A foam layer 303 is provided with an inflation tube 330 generally as described above.

An upper enclosure layer 304 is provided below the foam layer 303, forming the top of the fluid-impervious flexible enclosure 320. Flexible enclosure 320 encloses the crushable structure 350. The structure 350 comprises an upper corrugated layer 305, a lower corrugated layer 307, and a crushable matrix 306.

The crushable matrix 306 comprises hemispherical elements 366 joined together at respective convexities. The elements 366 are bathed in viscous fluid 360. As shown for this embodiment, the viscous fluid 360 is within the volumes circumscribed by the elements 366 as well as outside of them. Highly viscous fluid 360 comprises a viscous fluid of soybean oil, linseed oil, sunflower oil, or pine oil (along with antioxidant or other customary preservative); an oil/water emulsion; or petroleum oil, silicone, block polymer or other benign viscous substance, as well as microparticles 361 and macroparticles 362 distributed therethrough.

The corrugated metallic layer 307 forms the lower portion of the crushable structure 350, which also comprises the crushable matrix 306 and corrugated metallic layer 305.

Fluid-impervious barrier 308 forms the bottom of the flexible enclosure 320, which also comprises the barrier 304 and gusseted edges 316.

Adhesive layer 309 bonds the enclosure 320 to the toepan 310.

Figure 4:
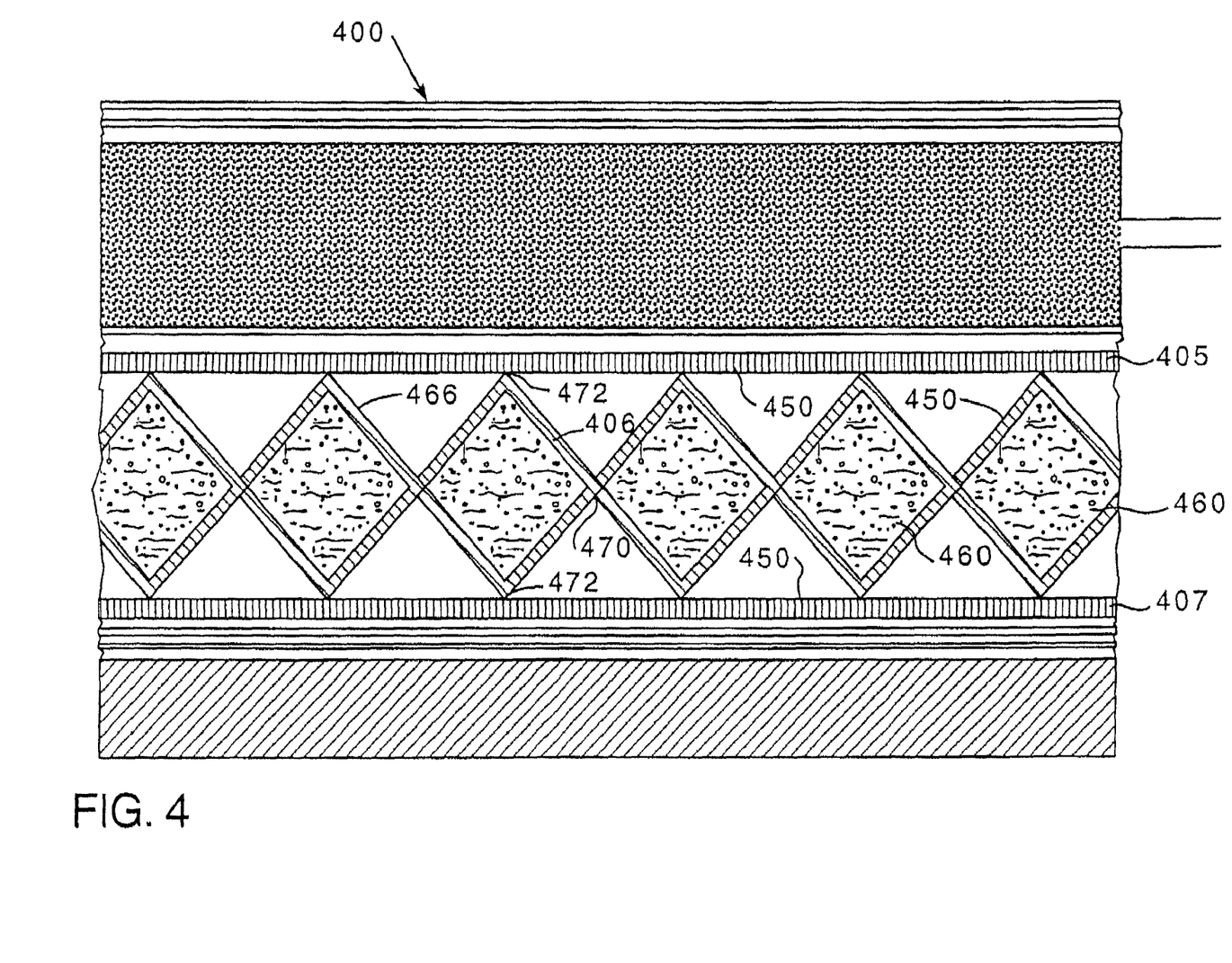
FIG. 4 is a view similar to FIG. 1, of an alternative embodiment wherein the matrix elements comprise joined pyramids.

FIG. 4 shows an alternative embodiment of the device 400 of the present invention. The crushable structure 350 comprises a pair of honeycomb structures 405 and 407, as well as a multiplicity of pyramidal elements 466 that together comprise a matrix 406. As shown the pyramidal elements are joined at their apexes 470, and their bases 472 abut the honeycomb structures 405 and 407.

The interiors of the pyramidal elements of this embodiment may be filled with air, and the exteriors are bathed in highly viscous fluid 460.

Figure 5:
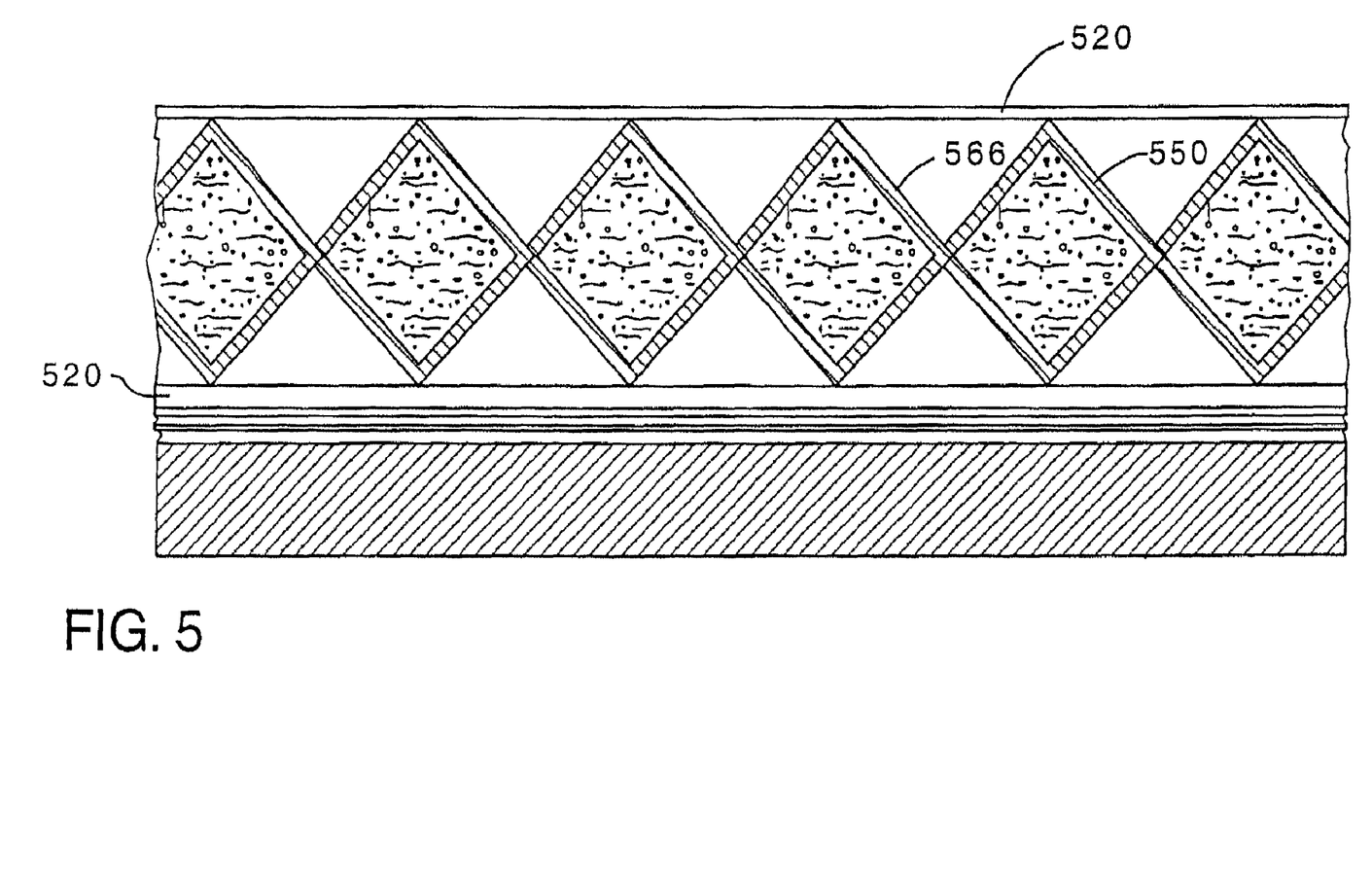
FIG. 5 is a view similar to FIG. 1, but of only the matrix of yet another alternative embodiment.

FIG. 5 shows the matrix of an alternative embodiment, wherein the crushable structure 550 consists of a multiplicity of pyramidal matrix elements 566. This embodiment does not contain a honeycomb or corrugated layer in the crushable structure 550. In use, the honeycomb or corrugated layer may be entirely omitted, or such layers may be placed outside the flexible enclosure 520.

Figure 6:
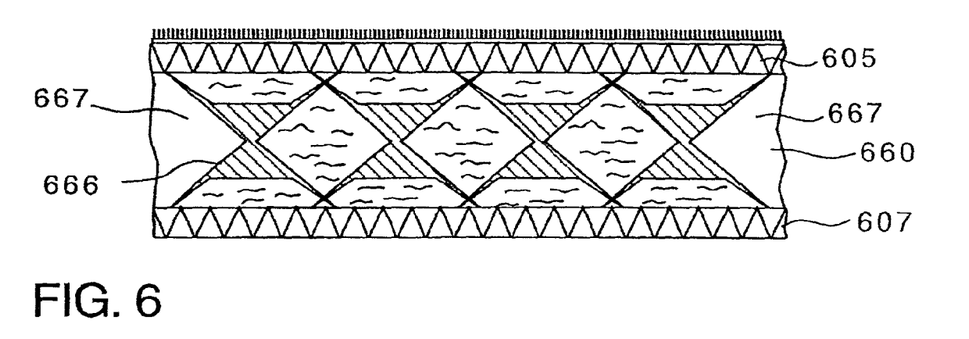
FIG. 6 is a diagrammatic cross-sectional view of yet another alternative embodiment.

FIG. 6 shows an embodiment of the invention wherein the crushable structure 650 comprises a multiplicity of pyramidal matrix elements 666 which are smaller than the matrix elements 466 shown in FIG. 4. The elements 666 are attached to corrugated layers 605 and 607 by arms 667 extending from the bases of the pyramids. Each of the aforesaid elements is a part of the crushable structure 650 and is bathed in highly viscous fluid 660.

Figure 7:
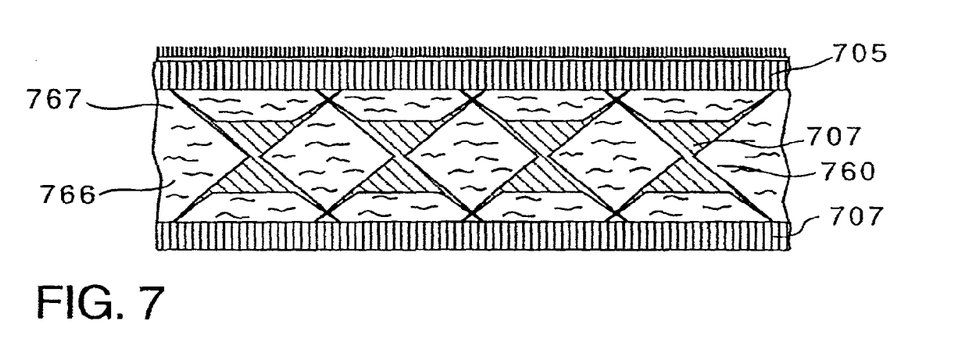
FIG. 7 is a diagrammatic cross-sectional view of still another embodiment.

Similarly FIG. 7 shows an embodiment of the invention wherein the crushable structure 750 comprises a multiplicity of pyramidal matrix elements 766 which are attached to honeycomb layers 705 and 707 by arms 767 extending from the bases of the pyramids. Each of the aforesaid elements is a part of the crushable structure 750 and is bathed in highly viscous fluid 760.

Those of skill in the art will understand that the aforesaid embodiments are examples of the more generalized invention described above in the Summary.

What is claimed is:

1. A trauma mitigation device comprising:
    an enclosure having a fluid impervious barrier;
    a crushable matrix disposed within said enclosure, wherein the crushable matrix has a plurality of matrix elements selected from the group consisting of cylinders, hemispheres or pyramids; and
    a viscous fluid disposed within said enclosure.

2. The trauma mitigation device of claim 1, wherein said fluid has a viscosity between about 300,000 CPS to 6,000,000 CPS.

3. The trauma mitigation device of claim 1, wherein said enclosure includes a layer of foam connected to a pressurized air source.

4. The trauma mitigation device of claim 1, wherein:
    the crushable matrix includes a plurality of hemispheres; and
    said hemispheres disposed in pairs connected at the convexities.

5. The trauma mitigation device of claim 1, wherein:
    the crushable matrix includes a plurality of pyramids; and
    said pyramids disposed in pairs connected at the apexes.

6. The trauma mitigation device of claim 1, wherein said enclosure includes a layer of foam connected to a pressurized air source.

7. The trauma mitigation device of claim 1 wherein:
    said viscous fluid includes macrosphere particles having a diameter between about 0.5 mm and 5.0 mm.

8. The trauma mitigation device of claim 7, wherein said fluid has a viscosity between about 300,000 CPS to 6,000,000 CPS.

9. The trauma mitigation device of claim 1, wherein said crushable matrix includes a supporting layer disposed adjacent to said enclosure.

10. The trauma mitigation device of claim 9, wherein said supporting layer is metal fashioned in a crushable shape.

11. The trauma mitigation device of claim 10, wherein said crushable shape is a corrugated sheet.

12. The trauma mitigation device of claim 9, wherein said supporting layer is made from a material selected from the group consisting of: ductile metal, polymeric material, ceramic, or ceramic alloy.

13. The trauma mitigation device of claim 10, wherein said crushable shape is a plurality of hexagonal cells.

14. The trauma mitigation device of claim 1, wherein said enclosure is formed from a flexible material selected from the group consisting of: a polymeric film, fully-reticulated foam, rubberized woven fabric, rubberized non-woven fabric, elastomeric woven material, or elastomeric non-woven material.

15. The trauma mitigation device of claim 14, wherein said flexible material is formed having at least one accordion pleat along an edge of said enclosure, said pleat structured to accommodate percussive expansion along the plane of said enclosure.

16. The trauma mitigation device of claim 14, wherein said material is formed of a pair of parallel barriers each about 20 mils thick.

17. The trauma mitigation device of claim 1, wherein said enclosure is formed from a flexible material selected from the group consisting of: a polymeric film, fully-reticulated foam, rubberized woven fabric, rubberized non-woven fabric, elastomeric woven material, or elastomeric non-woven material.

18. The trauma mitigation device of claim 17, wherein said flexible material is formed having at least one accordion pleat along an edge of said enclosure, said pleat structured to accommodate percussive expansion along the plane of said enclosure.

19. The trauma mitigation device of claim 17, wherein said material is formed of a pair of parallel barriers each about 20 mils thick.

20. A trauma mitigation device comprising:
an enclosure having a fluid impervious barrier;
a crushable matrix disposed within said enclosure;
a viscous fluid disposed within said enclosure;
wherein said crushable matrix includes a plurality of hemispheres;
said hemispheres disposed in pairs connected at the convexities; and
wherein said viscous fluid is disposed inside of and outside of said hemispheres.

21. A trauma mitigation device comprising:
an enclosure having a fluid impervious barrier;
a crushable matrix disposed within said enclosure;
a viscous fluid disposed within said enclosure;
said crushable matrix includes a plurality of pyramids;
said pyramids disposed in pairs connected at the apexes; and
wherein said viscous fluid is disposed outside of each said pyramid.

22. The trauma mitigation device of claim 21, wherein:
wherein said crushable matrix includes a supporting layer;
said each pyramid in said plurality of pyramids has a base; and
each said pyramid base abuts said supporting layer.

23. A trauma mitigation device comprising:
an enclosure having a fluid impervious barrier;
a crushable matrix disposed within said enclosure;
a viscous fluid disposed within said enclosure;
said crushable matrix includes a plurality of pyramids;
said pyramids disposed in pairs connected at the apexes;
wherein said crushable matrix includes a supporting layer;
said each pyramid in said plurality of pyramids has a base with arms extending from said base; and
said arms contact said supporting layer.

* * * * *